(12) United States Patent
Komori et al.

(10) Patent No.: US 7,968,482 B2
(45) Date of Patent: Jun. 28, 2011

(54) GLASS SUBSTRATE

(75) Inventors: Hiroshi Komori, Otsu (JP); Shinkichi Miwa, Otsu (JP)

(73) Assignee: Nippon Electric Glass Co., Ltd., Otsu-Shi Shiga (JP)

( * ) Notice: Subject to any disclaimer, the term of this patent is extended or adjusted under 35 U.S.C. 154(b) by 0 days.

(21) Appl. No.: 12/379,982

(22) Filed: Mar. 5, 2009

(65) Prior Publication Data

US 2009/0176038 A1    Jul. 9, 2009

Related U.S. Application Data

(63) Continuation of application No. PCT/JP2008/072940, filed on Dec. 17, 2008.

(30) Foreign Application Priority Data

Dec. 19, 2007   (JP) .................................. 2007-327385
Dec. 19, 2007   (JP) .................................. 2007-327393

(51) Int. Cl.
*C03C 3/095* (2006.01)
(52) U.S. Cl. ................ 501/65; 428/220; 65/90; 501/66; 501/67; 501/70
(58) Field of Classification Search .................... 501/65, 501/66, 67; 428/1.1, 220; 65/90
See application file for complete search history.

(56) References Cited

U.S. PATENT DOCUMENTS

| | | |
|---|---|---|
| 5,374,595 A | 12/1994 | Dumbaugh, Jr. et al. |
| 5,851,939 A | 12/1998 | Miwa |
| 7,018,272 B2 * | 3/2006 | Allaire et al. ................... 451/11 |
| 7,534,734 B2 * | 5/2009 | Ellison ............................. 501/66 |
| 2002/0151426 A1 * | 10/2002 | Murata et al. ................... 501/66 |
| 2005/0065014 A1 * | 3/2005 | Narita et al. ..................... 501/66 |
| 2006/0003884 A1 * | 1/2006 | Nishizawa et al. .............. 501/72 |
| 2009/0226671 A1 * | 9/2009 | Yanase et al. ................... 428/156 |

FOREIGN PATENT DOCUMENTS

| | | |
|---|---|---|
| EP | 0 607 865 | 7/1994 |
| JP | 2990379 | 10/1999 |
| JP | 2002-29775 | 1/2002 |
| JP | 3465238 | 8/2003 |
| JP | 2006-36625 | 2/2006 |
| JP | 2006-36626 | 2/2006 |
| JP | 2006036626 A * | 2/2006 |
| JP | 2008001588 A * | 1/2008 |
| WO | 2007/136054 | 11/2007 |
| WO | 2007/138832 | 12/2007 |

OTHER PUBLICATIONS

International Search Report dated Mar. 24, 2009 in the International (PCT) Application PCT/JP2008/072940 of which the present application is the U.S. National Stage.
Form PCT/IB/338 dated Jul. 29, 2010 together with International Preliminary Report on Patentability including translation of PCT Written Opinion in the International (PCT) Application PCT/JP2008/072940 of which the present application is the U.S. National Stage.

* cited by examiner

*Primary Examiner* — Karl E Group
*Assistant Examiner* — Elizabeth A Bolden
(74) *Attorney, Agent, or Firm* — Wenderoth, Lind & Ponack, L.L.P.

(57) ABSTRACT

Provided is a glass substrate, which has a substrate size of 1,100 mm×1,250 mm or more, and a transmittance at a wavelength of 500 to 800 nm and at a route length of 50 mm of 80% or more.

8 Claims, No Drawings

GLASS SUBSTRATE

CROSS-REFERENCE TO RELATED APPLICATION

This is a continuation application of international application PCT/JP2008/072940 filed Dec. 17, 2008, and claiming the priorities of Japanese applications 2007-327385 filed Dec. 19, 2007 and 2007-327393 filed Dec. 19, 2007.

TECHNICAL FIELD

The present invention relates to a glass substrate suitable as a substrate for flat panel displays such as liquid crystal displays (LCD), electroluminescence (EL) displays, plasma display panels (PDP), and field emission displays (FED) of various modes having various electron emission devices.

BACKGROUND ART

Electronic devices such as thin film transistor type active matrix LCD (TFT-LCD) are used in various applications such as car navigations, digital camera finders, and in addition, personal computer monitors and television sets, because the electron devices are thin and need small electric power consumption.

In general, aluminoborosilicate glasses containing substantially no alkali metal oxide are used as materials of a glass substrate for TFT-LCD, and there are various glass compositions suggested until now (see Patent Documents 1 to 3).

TFT-LCD panel manufacturers try to improve productivity and decrease cost by producing a plurality of devices on a glass substrate (rough plate) which are formed by glass manufacturers, then, cutting the substrate to divide into respective devices, and collecting a product. Recently, the screen sizes of personal computer monitors, television sets, and the like has been enlarged, thus, a large-sized glass substrate is required for multiple production of those devices.

[Patent Document 1] JP 2990379 B
[Patent Document 2] JP 3465238 B
[Patent Document 3] JP 2002-29775 A

DISCLOSURE OF THE INVENTION

Problems to be Solved by the Invention

As described above, in recent years, there has been a tendency of increase in the substrate size of a glass substrate, and in present day, glass substrates having a substrate size of 2,000 mm×2,000 mm or more are being used. When the substrate size of a glass substrate increases, however, it becomes difficult to perform appropriately a melt failure check, and to obtain a glass substrate having no melt failure.

Specifically, the melt failure check of a glass substrate is carried out by allowing a light to enter from one substrate end surface of a glass substrate and detecting the light transmitted to the other substrate end surface side (non-incident side). In this method, if a melt failure is present in the glass substrate, the incident light from one substrate end surface collides with the melt failure and is scattered, thus, the presence or absence of melt failures can be detected by observing and measuring the scattered light from the front surface of the glass substrate visually or with a CCD camera and the like. If incident lights are introduced to limited end surface direction, a light from a light source scarcely exerts an influence on the detection precision, and as a result, the melt failure check can be endowed with higher definition. However, when the substrate size of a glass substrate becomes large, the route length to the other substrate end surface side (non-incident side) becomes longer, and the proportion of the incident light absorbed by glass increases. Accordingly, the quantity of a light transmitting the glass substrate decreases, and as a result, even if a melt failure is present in the glass substrate, sufficient illuminance cannot be obtained on the other substrate end surface side (non-incident side), and the melt failure cannot be detected easily. The problem becomes remarkable when the substrate size of a glass substrate is 1,100 mm×1,250 mm or more, particularly 2,000 mm×2,000 mm or more.

There is also supposed a method of improving illuminance at the light source side for improving the detection precision of a melt failure in a glass substrate of large substrate size, however, if illuminance at the light source side is increased too much, parts around a substrate end surface for light incidence become too bright adversely and it becomes difficult to detect fine melt failures. After all, the method is not an effective solution means.

Then, it is a technical object of the present invention to obtain a large-sized glass substrate having no melt failure by carrying out a melt failure check appropriately over the whole glass substrate surface when the substrate size is 1,100 mm×1,250 mm or more, particularly 2,000 mm×2,000 mm or more.

Means for Solving the Problems

The inventors of the present invention have intensively studied and resultantly found that the detection precision of a melt failure check can be evaluated, in the case where a glass substrate is large, by using the transmittance at a wavelength of 500 to 800 nm and at a route length (thickness) of 50 mm as an index and that the above-mentioned technical object can be attained by regulating the transmittance at a wavelength of 500 to 800 nm and at a route length of 50 mm, and thus, the present invention is proposed. That is, the glass substrate of the present invention has a substrate size of 1,100 mm×1,250 mm or more, and a transmittance at a wavelength of 500 to 800 nm and at a route length of 50 mm of 80% or more. Here, "substrate size" denotes the area of one surface among the front surface and the rear surface of the glass substrate. Further, "transmittance at a wavelength of 500 to 800 nm and at a route length of 50 mm is 80% or more" means that the transmittance is 80% or more in the whole region of a wavelength of 500 to 800 nm.

If the transmittance at a wavelength of 500 to 800 nm and at a route length of 50 mm is regulated to 80% or more in the case where the substrate size of a glass substrate is 1,100 mm×1,250 mm or more, the proportion of the incident light absorbed by the glass at one substrate end surface of the glass substrate decreases, and even if the route length to the other substrate end surface side (non-incident side) is longer, decrease in the quantity of a light transmitting the glass substrate can be suppressed, that is, sufficient illuminance can be obtained around the other substrate end surface side (non-incident side). As a result, melt failures can be detected appropriately over the whole surface of the glass substrate.

The glass substrate of the present invention is, in the above-mentioned constitution, free of a melt failure of 25 μm or more. In this way, image failures derived from the glass substrate can be reduced, thus, higher definition and higher performance of a display can be appropriately obtained. Here, "melt failure" includes unmelted material, refractory mixing, devitrified clot, bubble, or the like.

The glass substrate of the present invention includes, in the above-mentioned constitution, 0.001 to 0.03 mass % of $Fe_2O_3$ in a glass composition. Here, "$Fe_2O_3$" referred to in the present invention include not only iron oxides present in the form of $Fe^{3+}$, but also iron oxides present in the form of $Fe^{2+}$. The iron oxide present in the form of $Fe^{2+}$ is expressed in terms of $Fe_2O_3$.

The glass substrate of the present invention has, in the above-mentioned constitution, an average surface roughness Ra of a substrate end surface of 1 μm or less. Here, "average surface roughness Ra of the substrate end surface" denotes a value measured by a method according to JIS B0601: 2001, under conditions of an evaluation length of 8 mm, a cut off value λc=0.8 mm, and a cut off ratio λc/λs=100.

The glass substrate of the present invention has, in the above-mentioned constitution, a surface of the substrate which is free from being polished and has a waviness of 0.1 μm or less. Here, "surface of the substrate which is free from being polished" means that at least the front surface (preferential assured surface) of the glass substrate, preferably, both the front and rear surfaces of the glass substrate, are not polished, excluding end surfaces of the glass substrate. Further, "waviness" means a value measuring WCA (filtered center line waviness) described in JIA B-0610 using a stylus type surface texture measuring apparatus. This measurement is carried out by a method according to SEMI STD D15-1296 "measurement method of surface waviness of FPD glass substrate", with a cut off in measurement of 0.8 to 8 mm and a length in a direction vertical to the drawing direction of the glass substrate of 300 mm.

The glass substrate of the present invention is, in the above-mentioned constitution, formed by an overflow downdraw method. In this way, a glass substrate having a smooth substrate surface can be obtained with no polishing.

The glass substrate of the present invention has, in the above-mentioned constitution, a glass composition including, by mass % in terms of oxide, 50 to 80% of $SiO_2$, 0 to 20% of $B_2O_3$, 0 to 15% of MgO, 0 to 15% of CaO, 0 to 15% of SrO, 0 to 15% of BaO, 0 to 15% of $Na_2O$, 0 to 10% of $K_2O$, and 0.001 to 0.03% of $Fe_2O_3$.

Further, the glass substrate of the present invention has, in the above-mentioned constitution, a glass composition including 3 to 20 mass % of $B_2O_3$, and is substantially free of alkali metal oxides ($Li_2O$, $Na_2O$, $K_2O$). Here, "substantially free of alkali metal oxides" denotes a case in which the content of alkali metal oxides in the glass composition is 1,000 ppm (mass) or less.

The glass substrate of the present invention is suitable for a display, in particular, a liquid crystal display, and an organic EL display.

The inventors of the present invention have intensively studied and resultantly found that the above-mentioned technical object can be attained by regulating a transmittance at a wavelength of 550 nm and at a route length (thickness) of 50 mm, and a difference between the transmittance at a wavelength of 550 nm and at a route length of 50 mm and a transmittance at a wavelength of 650 nm and at a route length of 50 mm, and thus, proposing the present invention. That is, the glass substrate of the present invention has a substrate size of 1,100 mm×1,250 mm or more, a transmittance at a wavelength of 550 nm and at a route length of 50 mm of 85% or more, and a difference between the transmittance at a wavelength of 550 nm and at a route length of 50 mm and a transmittance at a wavelength of 650 nm and at a route length of 50 mm of 3% or less. Here, "substrate size" also denotes the area of one surface among the front surface and the rear surface of the glass substrate.

If the transmittance at a wavelength of 500 nm and at a route length of 50 mm is regulated to 85% or more in the case where the substrate size of a glass substrate is 1,100 mm×1,250 mm or more, the proportion of the incident light absorbed by the glass at one substrate end surface of the glass substrate decreases, and even if the route length to the other substrate end surface side (non-incident side) is longer, decrease in the quantity of a light transmitting the glass substrate can be suppressed, that is, sufficient illuminance can be obtained around the other substrate end surface side (non-incident side). As a result, melt failures can be detected appropriately over the whole surface of the glass substrate.

The inventors of the present invention have intensively studied and resultantly found that $Cr^{3+}$ contained in the glass composition lowers the transmittance of the glass substrate and exerts a significant influence on the check precision of the melt failure check, and they have regulated a difference between the transmittance at a wavelength of 550 nm and at a route length of 50 mm and the transmittance at a wavelength of 650 nm and at a route length of 50 mm, as an index for evaluating the influence of $Cr^{3+}$. That is, the glass substrate of the present invention regulates, in the case where the substrate size is 1,100 mm×1,250 mm or more, the difference between the transmittance at a wavelength of 550 nm and at a route length of 50 mm and the transmittance at a wavelength of 650 nm and at a route length of 50 mm to 3% or lower, thereby preventing decrease in the check precision of the melt failure check due to $Cr^{3+}$. Here, when the difference between the transmittance at a wavelength of 550 nm at which absorption of $Cr^{3+}$ is small and the transmittance at a wavelength at 650 nm at which absorption of $Cr^{3+}$ is large is larger, the influence of $Cr^{3+}$ is larger.

The glass substrate of the present invention is, in the above-mentioned constitution, free of a melt failure of 25 μm or more. In this way, image failures derived from the glass substrate can be reduced, thus, higher definition and higher performance of a display can be appropriately obtained. Here, "melt failure" includes unmelted material, refractory mixing, devitrified clot, bubble, or the like.

The glass substrate of the present invention includes, in the above-mentioned constitution, 0.0001 to 0.002 mass % of $Cr_2O_3$ in a glass composition. When the content of $Cr_2O_3$ is regulated to to 0.002 mass %, it becomes easy to prevent decrease in the check precision of the melt failure check due to $Cr^{3+}$.

The glass substrate of the present invention has, in the above-mentioned constitution, an average surface roughness Ra of a substrate end surface of 1 μm or less. Here, "average surface roughness Ra of a substrate end surface" is as defined above.

The glass substrate of the present invention has, in the above-mentioned constitution, a surface of the substrate which is free from being polished and has a waviness of 0.1 μm or less. Here, "surface of the substrate which is free from being polished" and "waviness" are as defined above.

The glass substrate of the present invention is, in the above-mentioned constitution, formed by an overflow downdraw method. In this way, a glass substrate having a smooth substrate surface can be obtained with no polishing.

The glass substrate of the present invention has, in the above-mentioned constitution, a glass composition including, by mass % in terms of oxide, 50 to 80% of $SiO_2$, 0 to 20% of $B_2O_3$, 0 to 15% of MgO, 0 to 15% of CaO, 0 to 15% of SrO, 0 to 15% of BaO, 0 to 15% of $Na_2O$, 0 to 10% of $K_2O$, and 0.0001 to 0.002% of $Cr_2O_3$.

Further, the glass substrate of the present invention has, in the above-mentioned constitution, a glass composition including 3 to 20 mass % of $B_2O_3$, and is substantially free of alkali metal oxides ($Li_2O$, $Na_2O$, $K_2O$). Here, "substantially free of alkali metal oxides" denotes a case in which the content of alkali metal oxides in the glass composition is 1,000 ppm (mass) or less.

The glass substrate of the present invention is suitable for a display, in particular, a liquid crystal display, and an organic EL display.

BEST MODE FOR CARRYING OUT THE INVENTION

In the glass substrate of the first embodiment, the substrate size is 1,100 mm×1,250 mm or more, preferably 1,500 mm×1,800 mm or more, more preferably 1,870 mm×2,200 mm or more, still more preferably 2,350 mm×2,500 mm or more, particularly preferably 2,400 mm×2,800 mm or more, and most preferably 2,850 mm×3,050 mm or more. That is, when the substrate size of the glass substrate is larger, the effect obtained by the present invention becomes more remarkable. When the substrate size of the glass substrate is larger, the route length necessary for the melt failure check becomes longer, with a result that it becomes difficult to obtain enough illuminance for carrying out the melt failure check. However, in the glass substrate of this embodiment, the transmittance at a wavelength of 500 to 800 nm and at a route length of 50 mm is high, thus, a melt failure in the glass substrate can be surely detected even if the substrate size is large. In the glass substrate of this embodiment, the upper limit of the substrate size is not particularly limited, and when the productivity of the glass substrate is taken into consideration, the substrate size is preferably 4,000 mm×4,000 mm or less.

In the glass substrate of this embodiment, the transmittance at a wavelength of 500 to 800 nm and at a route length of 50 mm is 80% or more, preferably 81% or more, more preferably 82% or more, and still more preferably 83% or more. In this way, when the substrate size of the glass substrate is large, the melt failure check can be carried out appropriately, and a melt failure present in the glass substrate can be surely detected.

It is preferred that the glass substrate in this embodiment be free of melt failures of 25 μm or more (preferably 20 μm or more and more preferably 15 μm or more). When the melt failure of 25 μm or more is present in the glass substrate, the melt failure can disturb higher definition and higher performance of a display. In the glass substrate of the present invention, the melt failure check can be performed appropriately even if the substrate size is large, thus, a glass substrate containing the melt failure of 25 μm or more can be easily detected.

$Fe_2O_3$ is a component contained in a glass raw material and the like as an impurity. In the glass composition, iron oxides are present mainly in two forms of $Fe^{2+}$ and $Fe^{3+}$. $Fe^{3+}$ causes absorption of light in visible to ultraviolet range (around 350 to 450 nm), and $Fe^{2+}$ causes absorption of light in the long wavelength range of 600 to 1,000 nm. The existence ratio of $Fe^{2+}$ to $Fe^{3+}$ varies depending on various factors such as melt conditions (melting temperature, melting atmosphere, melting time, and the like), glass raw materials, and impurities. Therefore, the transmittance at a wavelength of 500 to 800 nm and at a route length of 50 mm is not uniquely determined by the content of $Fe_2O_3$ in the glass composition. However, when the content of $Fe_2O_3$ is regulated to 0.03% or less, preferably 0.025% or less, and more preferably 0.02% or less, the transmittance at a wavelength of 500 to 800 nm and at a route length of 50 mm can be easily regulated to 80% or more.

When the content of $Fe_2O_3$ is regulated to 0, the transmittance at a wavelength of 500 to 800 nm and at a route length of 50 mm can be enhanced. However, such a case is not realistic, because it is necessary to use a glass raw material of high purity, to strictly control the production process of the glass substrate, and to regulate the content of impurities in $Fe_2O_3$ to 0, thereby leading to undue increase of the production cost of the glass substrate. Therefore, if the production cost of the glass substrate is taken into consideration, it is preferable to regulate the content of $Fe_2O_3$ to 0.001% or more (preferably 0.005% or more, more preferably 0.006% or more, and still more preferably 0.007% or more).

It is preferable to reduce as much as possible the content of components absorbing light in the visible region or enhancing absorption of light in the visible region, for example, transition metal oxides, in addition to $Fe_2O_3$. For example, it is preferable to regulate the content of $CeO_2$ to 0.1% or less (preferably 0.05% or less and more preferably 0.01% or less). However, if the production cost of the glass substrate is taken into consideration like the case of $Fe_2O_3$, it is preferable to regulate the content of $CeO_2$ to 0.001% or more. Further, it is preferable to regulate the content of $TiO_2$ to 0.1% or less (preferably 0.05% or less and more preferably 0.01% or less). However, if the production cost of the glass substrate is taken into consideration, it is preferable to regulate the content of $TiO_2$ to 0.001% or more. Further, it is preferable to regulate the content of NiO to 0.05% or less (preferably 0.01% or less and more preferably 0.005% or less). However, if the production cost of the glass substrate is taken into consideration, it is preferable to regulate the content of NiO to 0.001% or more.

In the glass substrate of this embodiment, it is preferred that the surface of the substrate be not polished. When the surface of the substrate is free from being polished, the polishing process is omitted, thus, the production cost of the glass substrate can be decreased significantly. In the glass substrate of this embodiment, it is preferred that the waviness be 0.1 μm or less (preferably 0.05 μm or less, more preferably 0.03 μm or less, and still more preferably 0.01 μm or less). When the waviness of the glass substrate is more than 0.1 μm, there is a possibility of causing display irregularity due to variation of cell gaps in the production process of LCD and the like. If the production conditions are adjusted and a glass substrate is formed by an overflow downdraw method, a glass substrate can be obtained in which the surface of the substrate is free from being polished and has a waviness of 0.1 μm or less.

In the glass substrate of this embodiment, it is preferred that the average surface roughness Ra of the substrate end surface be preferably 1 μm or less and more preferably 0.5 μm or less. In the melt failure check of the glass substrate, a light is incident to one substrate end surface of the glass substrate, and the illuminance of the light reaching the other substrate end surface side (non-incident side) is measured. Therefore, the surface condition of the substrate end surface of the glass substrate exerts an influence on the melt failure check to no small extent. When the average surface roughness Ra of the substrate end surface is more than 1 μm, the light scatters at the substrate end surface, and the check precision of the melt failure check tends to decrease.

The glass substrate used in LCD or organic EL displays is also required to have properties as described below.

(1) The glass substrate has chemical resistance so that the glass substrate does not deteriorate by various chemicals such as acids and alkalis in the photo-etching process.

(2) The glass substrate does not show thermal shrinkage in thermal treatment processes such as film formation and annealing. For this purpose, the glass substrate has a high strain point.

(3) The glass substrate is excellent in glass meltability and formability so as not to generate melt failures which are not preferable for the glass substrate.

It is preferred that, when the glass substrate of this embodiment is immersed in a 10% HCl aqueous solution at 80° C. for 3 hours, white turbidity and roughness be not recognized by visual surface observation. Further, it is preferred that when the glass substrate of this embodiment is immersed in a 63BHF solution (HF: 6 mass %, NH$_4$F: 30 mass %) of 20° C. for 15 minutes, white turbidity and roughness be not recognized by visual surface observation. On the surface of a glass substrate for TFT-LCD, a transparent electric conductive membrane, insulation membrane, semiconductor membrane, metal membrane, and the like are formed, and in addition, various circuits and patterns are formed by photo-etching. In those film formation processes or photo-etching process, various thermal treatments and chemical treatments are performed on the glass substrate. In general, in a TFT array process, the following series of processes are repeated: film formation process; resist pattern formation process; etching process; and resist peeling process. In this procedure, various chemical liquids are used as the etching liquid, such as a phosphoric acid solution for etching of Al, Mo membranes, a royal water (HCl+HNO$_3$) solution for etching of ITO membrane, and a BHF solution for etching of SiNx membrane, SiO$_2$ membrane, and the like, and those are not disposable, and used in the mode of circulating liquid flow, in view of decrease in cost. When the glass substrate has low chemical resistance, there is a possibility of causing various problems at the time of etching, such as clogging of a filter in the circulating liquid flow by the reaction product of the chemical liquid and the glass substrate, generation of white turbidity on the surface of the glass substrate because of uneven etching, unstable etching rate due to the change in components of the etching liquid.

In the glass substrate of this embodiment, the strain point is preferably 630° C. or higher, more preferably 635° C. or higher, still more preferably 640° C. or higher, and most preferably 645° C. or higher. In the production process of TFT-LCD, the glass substrate is subjected to a thermal treatment at high temperature. When the strain point of the glass substrate is lower than 630° C., for example in the case where the glass substrate is subjected to the thermal treatment at 400 to 600° C., fine size reduction called thermal shrinkage occurs, and this causes shift of pixel pitch of TFT, which may generate display fault. When the strain point of the glass substrate is lower than 630° C., there may occur deformation, warping, and the like of the glass substrate. Here, "strain point" denotes a value measured by a method according to ASTM C336.

In the glass substrate of this embodiment, the liquidus temperature is preferably 1,200° C. or lower, more preferably 1,150° C. or lower, still more preferably 1,080° C. or lower, particularly preferably 1,050° C. or lower, and most preferably 1,030° C. or lower. In general, the viscosity at the time of forming a glass is higher in the overflow downdraw method as compared with other forming methods such as a float method, thus, when the glass devitrification resistance is poor, devitrified clots are generated in forming, and the forming of a glass substrate becomes difficult. Specifically, when the liquidus temperature is higher than 1,200° C., forming by the overflow downdraw method becomes difficult, and a glass substrate having excellent surface quality is not obtained easily. That is, when the liquidus temperature is higher than 1,200° C., undue restriction is imposed on the forming method of the glass substrate, and it becomes difficult to form a glass substrate having desired surface quality. Here, a glass is ground, a glass powder passing through a standard sieve of 30 mesh (500 μm) and remaining on 50 mesh (300 μm) is placed in a platinum boat, kept in a temperature gradient furnace for 24 hours, then, the crystal thereof deposits in the glass, and the temperature at this stage is referred to as "liquidus temperature".

In the glass substrate of this embodiment, the temperature at $10^{2.5}$ dPa·s is preferably 1,575° C. or lower and more preferably 1,560° C. or lower. When the glass is melted at high temperature for a longer period of time, melt failures such as bubble and extraneous materials can be reduced, but melting at high temperatures increases burden on a glass melting furnace. For example, refractories such as alumina and zirconia used in a furnace are more significantly corroded by the molten glass when the temperature is higher, which also shortens the furnace life cycle. Further, the running cost for maintaining the inside of the furnace at high temperatures increases as compared with the case of melting at low temperatures. Therefore, melting at high temperatures is disadvantageous for producing a glass substrate. The temperature of the molten glass at a high temperature viscosity of $10^{2.5}$ dPa·s corresponds to the melting temperature. Here, "temperature at $10^{2.5}$ dPa·s" denotes a value measured by a known platinum lifting method.

The glass substrate of this embodiment preferably has a glass composition including, by mass % in terms of oxides, 50 to 80% of SiO$_2$, 0 to 20% of B$_2$O$_3$, 0 to 15% of MgO, 0 to 15% of CaO, 0 to 15% of SrO, 0 to 15% of BaO, 0 to 15% of Na$_2$O, 0 to 10% of K$_2$O, and 0.001 to 0.03% of Fe$_2$O$_3$, and when used in LCD or organic EL displays, preferably has a glass composition including, by mass % in terms of oxides, 50 to 80% of SiO$_2$, 3 to 20% of B$_2$O$_3$, 0 to 15% of MgO, 3 to 15% of CaO, 0 to 15% of SrO, 0 to 15% of BaO, and 0.001 to 0.03% of Fe$_2$O$_3$, and is substantially free of an alkali metal oxide.

The reason for limiting the glass composition range as described above in the glass substrate of this embodiment is shown below. Note that, unless otherwise mentioned, "%" means "mass %.

SiO$_2$ is a net work former of the glass, and is a component for improving the heat resistance of the glass, and specifically, is a component having an effect of increasing the strain point to decrease thermal shrinkage of the glass substrate. The content thereof is 50 to 80%, preferably 52 to 70%, and more preferably 54 to 68%. When the content of SiO$_2$ is large, the high temperature viscosity of the glass rises too much, and the meltability of the glass lowers, and in addition, devitrified clots of cristobalite tend to deposit. On the other hand, when the content of SiO$_2$ is small, the acid resistance and the strain point of the glass tend to lower.

Al$_2$O$_3$ is a component which raises the strain point of the glass, suppresses deposition of devitrified clots of cristobalite, and lowers the liquidus temperature of the glass. The content thereof is 5 to 25%, preferably 7 to 22%, and more preferably 9 to 20%. When the content of Al$_2$O$_3$ is large, there are tendencies that buffered hydrofluoric acid resistance (BHF resistance) of the glass lowers, and the liquidus temperature of glass increases, thereby, forming of the glass substrate becomes difficult. On the other hand, when the content of Al$_2$O$_3$ is small, the strain point of glass tends to lower.

B$_2$O$_3$ is a component acting as a flux, lowering the viscosity of the glass, and improving the meltability of the glass. The content thereof is 0 to 20%, preferably 3 to 20%, more preferably 5 to 15%, still more preferably 6 to 14%, and particularly preferably 7 to 13%. In the case of alkali-free glass containing substantially no alkali metal oxide in the glass composition, $B_2O_3$ is an essential component, and it is necessary that $B_2O_3$ be contained in the glass composition in an amount of 3% or more, preferably 6% or more, and more preferably 7% or more. When the content of $B_2O_3$ is large, there are tendencies that the strain point of the glass lowers, and the acid resistance of the glass lowers. On the other hand, when the content of $B_2O_3$ is small, the effect as a flux is not obtained easily.

MgO is a component not lowering the strain point of the glass but lowering only the high temperature viscosity, thereby improving the meltability of glass, and the content thereof is 0 to 15%, preferably 0 to 10%, more preferably 0 to 7%, and still more preferably 0 to 0.5%. When the content of MgO is large, devitrified clots of cristobalite and enstatite tend to be generated. When the content of MgO is large, BHF resistance lowers, the glass plate is corroded in the photo-etching process, and its reaction product adheres to the surface of the glass substrate, and hence white turbidity tends to be generated in the glass substrate.

CaO is a component not lowering the strain point of the glass but lowering only the high temperature viscosity, thereby improving the meltability of the glass, and the content thereof is 0 to 15%, preferably 0 to 12%, and more preferably 3 to 10%. In the case of alkali-free glass, CaO is an essential component, and it is necessary that CaO be contained in an amount of 3% or more in the glass composition. When the content of CaO is large, there are tendencies that the density and the thermal expansion coefficient of the glass increase, in addition to decrease in BHF resistance.

SrO is a component improving the chemical resistance and the devitrification resistance of the glass, and the content thereof is 0 to 15%, preferably 0 to 12%, and more preferably 1 to 10%. When the content of SrO is large, there is a tendency that the density and the thermal expansion coefficient of the glass increase.

BaO is a component improving the chemical resistance and the devitrification resistance of the glass, and the content thereof is 0 to 15%, preferably 0 to 12%, and more preferably 0 to 10%. When the content of BaO is large, there is a tendency that the density and the thermal expansion coefficient of the glass increase.

When alkaline earth metal oxides (MgO, CaO, SrO, BaO) are contained by mixing, the meltability and the devitrification resistance of the glass can be improved. When the amount of these components is large, the density of the glass tends to increase, and reduction of weight of the glass substrate becomes difficult. The contents of alkaline earth metal oxides, in total content, are 0 to 25%, preferably 1 to 22%, more preferably 5 to 20%, and still more preferably 7 to 18%.

$Na_2O$ is a component controlling the thermal expansion coefficient of the glass and enhancing the meltability of the glass, and the content thereof is 0 to 15% and preferably 0 to 10%. When the content of $Na_2O$ is large, the strain point of the glass tends to lower. $K_2O$ is a component controlling the thermal expansion coefficient of the glass and enhancing the meltability of the glass, and the content thereof is 0 to 10%. When the content of $K_2O$ is large, the strain point of the glass tends to lower. When used in LCD or organic EL displays, it is preferred that alkali metal oxides ($Na_2O$, $K_2O$, $Li_2O$) be not substantially contained. In this way, there is no possibility that an alkali metal ion is diffused in the film-formed semiconductor substance during a thermal treatment to deteriorate a membrane property, in the TFT production process, thus, reliability of TFT is not impaired.

$Fe_2O_3$ is a component exerting an influence on the transmission of the glass, and the content thereof is 0.001 to 0.03%, preferably 0.001 to 0.025%, more preferably 0.005 to 0.02%, still more preferably 0.006 to 0.02%, and particularly preferably 0.007 to 0.02%. When the content of $Fe_2O_3$ is larger than 0.03%, the transmittance of the glass substrate tends to lower. On the other hand, when the content of $Fe_2O_3$ is smaller than 0.001%, it is necessary to use glass raw materials of high purity and to strictly control the production process of the glass substrate, leading to undue increase in the production cost of the glass substrate.

The glass substrate of this embodiment can contain the following components in the glass composition in addition to the above-mentioned components, in a proportion of up to 15%.

ZnO is a component improving the BHF resistance of the glass and improving the meltability of the glass, and the content thereof is 0 to 10%, preferably 0 to 5%, and more preferably 0 to 3%. When the content of ZnO is large, the glass is easily devitrified, and the strain point tends to lower.

$ZrO_2$ is a component improving the chemical resistance of the glass, in particular, the acid resistance, and improving the Young's modulus, and the content thereof is 0 to 10%, preferably 0 to 2%, and more preferably 0 to 1%. When the content of $ZrO_2$ is large, the liquidus temperature of the glass increases, and devitrified clots of zircon tend to be formed.

$As_2O_3$, $Sb_2O_3$, $SnO_2$, Cl, and F are components each acting as a fining agent, and the content thereof is, in total content, 0 to 2%, preferably 0 to 1.5%, and more preferably 0.01 to 1%. As the fining agent, C and $SO_3$ can be also contained in a range not influencing the transmittance of the glass substrate. From the standpoint of protection of environments, it is preferred that $As_2O_3$ be not substantially contained as the fining agent. Here, "$As_2O_3$ be not substantially contained" denotes a case in which the content of $As_2O_3$ in the glass composition is 1,000 ppm (mass) or less. Further, from the standpoint of protection of environments, it is preferred that $Sb_2O_3$ be not substantially contained as the fining agent. Here, "$Sb_2O_3$ be not substantially contained" denotes a case in which the content of $Sb_2O_3$ in the glass composition is 1,000 ppm (mass) or less.

$As_2O_3$ is a component influencing the transmittance, and when it is contained in the glass composition, the transmittance of the glass substrate tends to lower. On the other hand, when $SnO_2$ is contained in the glass composition in an amount of 0.01 to 2%, or 0.05 to 1%, and particularly 0.1 to 0.5%, the transmittance of the glass can be enhanced by the reducing effect of $SnO_2$. As described above, regarding $As_2O_3$, $Sb_2O_3$, it is preferred that $As_2O_3$ be not substantially contained from the standpoint of protection of environments. When the above-mentioned point is taken into consideration, it is preferred that $SnO_2$ be contained as an essential component and $As_2O_3$ and $Sb_2O_3$ be not substantially contained, as the fining agent.

$Cr_2O_3$ is a component influencing the transmittance of the glass, and the content thereof is 0 to 0.001%, preferably 0.0001 to 0.002%, more preferably 0.0002 to 0.0015%, and still more preferably 0.0003 to 0.001%. Because $Cr^{3+}$ absorbs light at a wavelength range of 400 to 550 nm and at a wavelength range of 550 to 700 nm, when the content of $Cr_2O_3$ is larger than 0.002%, the check precision of the melt failure check tends to decrease. On the other hand, when the content of $Cr_2O_3$ is smaller than 0.0001%, it is necessary to use glass raw materials of high purity and to strictly control the production process of the glass substrate, thereby leading to undue increase in the production cost of the glass substrate.

As described above, it is preferable to reduce as much as possible the content of components absorbing light in the visible region or enhancing absorption of light in the visible region, for example, transition metal oxides. For example, it is preferable to regulate the content of $CeO_2$ to 0.1% or less (preferably 0.05% or less and more preferably 0.01% or less). However, if the production cost of the glass substrate is taken into consideration, it is preferable to regulate the content of $CeO_2$ to 0.001% or more. Further, it is preferable to regulate the content of $TiO_2$ to 0.1% or less (preferably 0.05% or less and more preferably 0.01% or less). However, if the production cost of the glass substrate is taken into consideration, it is preferable to regulate the content of $TiO_2$ to 0.001% or more. Further, it is preferable to regulate the content of NiO to 0.05% or less (preferably 0.01% or less and more preferably 0.005% or less). However, if the production cost of the glass substrate is taken into consideration, it is preferable to regulate the content of NiO to 0.001% or more.

In addition to the above-mentioned components, components showing no remarkable absorption in the wavelength range of 500 to 800 nm can be added, and for example, $Y_2O_3$, $Nb_2O_5$, and $La_2O_3$ can be contained in an amount of up to 5%. Those components each have an action of enhancing the strain point, the Young's modulus, and the like of the glass. However, when the content thereof is too large, the density tends to increase.

The glass substrate in this embodiment can be produced by placing a glass raw material which is prepared to have a desired glass composition in a continuous melting furnace, melting the glass raw material by heating at 1,450 to 1,650° C., fining the resultant, feeding the resultant to a forming apparatus, forming the molten glass into a plate shape, and gradually cooling the resultant. Further, as the methods of regulating the transmittance of the glass substrate in the wavelength range of 500 to 800 nm to 80% or more, there are exemplified: (1) a method of using a glass raw material containing a small amount of impurities which lowers transmittance, in particular, a glass raw material containing a small amount of $Fe_2O_3$; (2) a method of preventing mixing of $Fe_2O_3$ and the like in the production process of the glass substrate; and (3) a method of adjusting the melting conditions of the glass, for example, melting temperature, melting atmosphere, and melting time.

As the material of a melting bath, alumina refractories such as alumina electrocast brick, zirconia refractories, zircon refractories, quartz refractories such as silica block, and the like are preferably used. Those refractories are suitable because they are not easily corroded by molten glass, and show small elution of components into glass.

It is preferred that the glass substrate in this embodiment be obtained by being formed by an overflow downdraw method. When a glass substrate is formed by the overflow downdraw method, a glass substrate which is free from being polished and has an excellent surface quality can be produced. The reason for this is as follows: in the case of adopting the overflow downdraw method, the surface to be the surface of the glass substrate does not come in direct contact with a trough-shaped refractory, and is formed in the form of free surface. Here, the overflow downdraw method is a method in which a molten glass is allowed to overflow from both sides of a heat-resistant trough-shaped structure, and the overflown molten glasses are draw-formed downwardly while combining them at the lower end of the trough-shaped refractory, to thereby produce a glass substrate. The structure and material of the trough-shaped refractory are not particularly limited as long as they provide desired size and surface precision of the glass substrate and can realize quality usable in the glass substrate. Further, any method may be used to apply force to the glass substrate to perform downward draw forming. For example, there may be adopted a method involving rotating a heat resistant roll having sufficiently large width in the state of being in contact with a glass substrate, to thereby draw the glass substrate, and a method involving allowing several pairs of heat resistant rolls to come into contact with only at the vicinity of end surfaces of the glass substrate to thereby draw the glass substrate. Note that, when the liquidus temperature is 1,200° C. or lower and the liquidus viscosity is $10^{4.0}$ dPa·s or more, the glass substrate can be produced by the overflow downdraw method.

As the method of forming the glass substrate of the present invention, various methods can be adopted in addition to the overflow downdraw method. For example, there can be adopted a float method, a slot downdraw method, and a roll out method.

The glass substrate of this embodiment is also preferably used in displays. In the glass substrate of this embodiment, the transmittance at a wavelength of 500 to 800 nm and at a route length of 50 mm is high, thus, a melt failure can be detected easily, and requirements for higher definition and higher performance of recent displays can be satisfied. It is preferred that the glass substrate of this embodiment be used in LCD or organic EL displays. The glass substrate of this embodiment is capable of easily improving the productivity and decreasing cost of LCD or organic EL displays, because the substrate size is large and the transmittance at a wavelength of 500 to 800 nm and at a route length of 50 mm is high. Further, the glass substrate of this embodiment is capable of satisfying various properties required for a LCD or an organic EL display, thus, suitable for the application thereto.

In the glass substrate of the second embodiment, the substrate size is 1,100 mm×1,250 mm or more, preferably 1,500 mm×1,800 mm or more, more preferably 1,870 mm×2,200 mm or more, still more preferably 2,350 mm×2,500 mm or more, particularly preferably 2,400 mm×2,800 mm or more, and most preferably 2,850 mm×3,050 mm or more. That is, when the substrate size of the glass substrate is larger, the effect obtained by the present invention becomes more remarkable. When the substrate size of the glass substrate is larger, the route length necessary for the melt failure check becomes longer, with a result that it becomes difficult to obtain enough illuminance for carrying out the melt failure check. However, in the glass substrate of this embodiment, the transmittance at a wavelength of 550 nm and at a route length of 50 mm is high, and a difference between the transmittance at a wavelength of 550 nm and at a route length of 50 mm and the transmittance at a wavelength of 650 nm and at a route length of 50 mm is small, thus, a melt failure in the glass substrate can be surely detected even if the substrate size is large. In the glass substrate of this embodiment, the upper limit of the substrate size is not particularly limited, and when the productivity of the glass substrate is taken into consideration, the substrate size is preferably 4,000 mm×4,000 mm or less.

In the glass substrate of this embodiment, the transmittance at a wavelength of 550 nm and at a route length of 50 mm is 85% or more, preferably 86% or more, and more preferably 87% or more. In this way, when the substrate size of the glass substrate is large, the melt failure check can be carried out appropriately, and a melt failure present in the glass substrate can be surely detected.

In the glass substrate of this embodiment, a difference between the transmittance at a wavelength of 550 nm and at a route length of 50 mm and the transmittance at a wavelength of 650 nm and at a route length of 50 mm is 3% or less, preferably 2% or less, more preferably 1.5% or less, and still more preferably 1% or less. In this way, it becomes easy to prevent decrease in the check precision of the melt failure check due to $Cr^{2+}$.

It is preferred that the glass substrate of this embodiment be free of melt failures of 25 μm or more (preferably 20 μm or more and more preferably 15 μm or more) for the same reason as described for the first embodiment.

$Cr_2O_3$ is a component contained as an impurity in glass raw materials and the like. In the glass composition, chromium oxide is present mainly in the form of $Cr^{3+}$. $Cr^{3+}$ causes absorption of light in the wavelength range of 400 to 550 nm and in the wavelength range of 550 to 700 nm. The wavelength of 550 nm is a wavelength present between those two wavelength ranges and showing relatively small absorption of $Cr^{3+}$. The wavelength of 650 nm is a wavelength showing large absorption of $Cr^{3+}$ in the wavelength range of 550 to 700 nm. Therefore, when a difference between the transmittance at a wavelength of 550 nm and at a route length of 50 mm and the transmittance at a wavelength of 650 nm and at a route length of 50 mm is smaller, an influence of absorption by $Cr^{3+}$ is smaller. If the difference between the transmittances is regulated, it becomes easy to prevent the situation where the check precision of the melt failure check decreases due to $Cr^{3+}$. The transmittance at a wavelength of 550 nm and at a route length of 50 mm and the transmittance at a wavelength of 650 nm and at a route length of 50 mm are not uniquely determined by the content of $Cr_2O_3$. However, when the content of $Cr_2O_3$ is regulated to 0.002 mass % or less, preferably 0.0015 mass % or less, and more preferably 0.001 mass % or less, it becomes easy to regulate a difference between the transmittance at a wavelength of 550 nm and at a route length of 50 mm and the transmittance at a wavelength of 650 nm and at a route length of 50 mm to 3% or less.

When the content of $Cr_2O_3$ is regulated to 0, it becomes easy to prevent decrease in the check precision of the melt failure check due to $Cr^{3+}$. However, such a case is not realistic, because it is necessary to use a glass raw material of high purity, to strictly control the production process of the glass substrate, and to regulate the content of impurities in $Cr_2O_3$ to 0, thereby leading to undue increase of the production cost of the glass substrate. Therefore, if the production cost of the glass substrate is taken into consideration, it is preferable to regulate the content of $Cr_2O_3$ to 0.0001% or more (preferably 0.0002% or more and more preferably 0.0003% or more).

It is preferable to reduce as much as possible the content of components absorbing light in the visible region or enhancing absorption of light in the visible region, for example, transition metal oxides, in addition to $Cr_2O_3$. For example, it is preferable to regulate the content of $CeO_2$ to 0.1% or less (preferably 0.05% or less and more preferably 0.01% or less). However, if the production cost of the glass substrate is taken into consideration like the case of $Cr_2O_3$, it is preferable to regulate the content of $CeO_2$ to 0.001% or more. Further, it is preferable to regulate the content of $TiO_2$ to 0.1% or less (preferably 0.05% or less and more preferably 0.01% or less). However, if the production cost of the glass substrate is taken into consideration, it is preferable to regulate the content of $TiO_2$ to 0.001% or more. Further, it is preferable to regulate the content of NiO to 0.05% or less (preferably 0.01% or less and more preferably 0.005% or less). However, if the production cost of the glass substrate is taken into consideration, it is preferable to regulate the content of NiO to 0.001% or more.

Also in the glass substrate of this embodiment, the surface of the substrate is preferably not polished and the waviness is preferably 0.1 μm or less (preferably 0.05 μm or less, more preferably 0.03 μm or less, and still more preferably 0.01 μm or less), for the same reason as described for the first embodiment.

Also in the glass substrate of this embodiment, the average surface roughness Ra of the substrate end surface is preferably 1 μm or less and more preferably 0.5 μm or less, for the same reason as described for the first embodiment.

Also in the glass substrate of this embodiment, it is preferred that, when the glass substrate is immersed in a 10% HCl aqueous solution at 80° C. for 3 hours, white turbidity and roughness are not recognized by visual surface observation, and that, when the glass substrate is immersed in a 63BHF solution (HF: 6 mass %, $NH_4F$: 30 mass %) at 20° C. for 15 minutes, white turbidity and roughness are not recognized by visual surface observation, for the same reason as described for the first embodiment.

Also in the glass substrate of this embodiment, the strain point is preferably 630° C. or higher, more preferably 635° C. or higher, still more preferably 640° C. or higher, and most preferably 645° C. or higher, for the same reason as described for the first embodiment.

Also in the glass substrate of this embodiment, the liquidus temperature is preferably 1,200° C. or lower, more preferably 1,150° C. or lower, still more preferably 1,080° C. or lower, particularly preferably 1,050° C. or lower, and most preferably 1,030° C. or lower, for the same reason as described for the first embodiment.

Also in the glass substrate of this embodiment, the temperature at $10^{2.5}$ dPa·s is preferably 1,575° C. or lower and more preferably 1,560° C. or lower, for the same reason as described for the first embodiment.

The glass substrate of this embodiment preferably has a glass composition including, by mass % in terms of oxides, 50 to 80% of $SiO_2$, 0 to 20% of $B_2O_3$, 0 to 15% of MgO, 0 to 15% of CaO, 0 to 15% of SrO, 0 to 15% of BaO, 0 to 15% of $Na_2O$, 0 to 10% of $K_2O$, and 0.0001 to 0.002% of $Cr_2O_3$, and when used in LCD or organic EL displays, preferably has a glass composition including, by mass % in terms of oxides, 50 to 80% of $SiO_2$, 3 to 20% of $B_2O_3$, 0 to 15% of MgO, 3 to 15% of CaO, 0 to 15% of SrO, 0 to 15% of BaO, and 0.0001 to 0.002% of $Cr_2O_3$, and is substantially free of an alkali metal oxide.

The reason for limiting the glass composition range as described above in the glass substrate of this embodiment is shown below. Note that, unless otherwise mentioned, "%" means "mass %.

$SiO_2$ is a net work former of the glass, and is a component for improving the heat resistance of the glass, and specifically, is a component having an effect of increasing the strain point to decrease thermal shrinkage of the glass substrate. The content thereof is 50 to 80%, preferably 52 to 70%, and more preferably 54 to 68%. When the content of $SiO_2$ is large, the high temperature viscosity of the glass rises too much, and the meltability of the glass lowers, and in addition, devitrified clots of cristobalite tend to deposit. On the other hand, when the content of $SiO_2$ is small, the acid resistance and the strain point of the glass tend to lower.

$Al_2O_3$ is a component which raises the strain point of the glass, suppresses deposition of devitrified clots of cristobalite, and lowers the liquidus temperature of the glass. The content thereof is 5 to 25%, preferably 7 to 22%, and more preferably 9 to 20%. When the content of $Al_2O_3$ is large, there are tendencies that buffered hydrofluoric acid resistance (BHF resistance) of the glass lowers, and the liquidus temperature of glass increases, thereby, forming of the glass substrate becomes difficult. On the other hand, when the content of $Al_2O_3$ is small, the strain point of glass tends to lower.

$B_2O_3$ is a component acting as a flux, lowering the viscosity of the glass, and improving the meltability of the glass. The content thereof is 0 to 20%, preferably 3 to 20%, more preferably 5 to 15%, still more preferably 6 to 14%, and particularly preferably 7 to 13%. In the case of alkali-free glass containing substantially no alkali metal oxide in the glass composition, $B_2O_3$ is an essential component, and it is necessary that $B_2O_3$ be contained in the glass composition in an amount of 3% or more, preferably 6% or more, and more preferably 7% or more. When the content of $B_2O_3$ is large, there are tendencies that the strain point of the glass lowers, and the acid resistance of the glass lowers. On the other hand, when the content of $B_2O_3$ is small, the effect as a flux is not obtained easily.

MgO is a component not lowering the strain point of the glass but lowering only the high temperature viscosity, thereby improving the meltability of glass, and the content thereof is 0 to 15%, preferably 0 to 10%, more preferably 0 to 7%, and still more preferably 0 to 0.5%. When the content of MgO is large, devitrified clots of cristobalite and enstatite tend to be generated. When the content of MgO is large, BHF resistance lowers, the glass plate is corroded in the photo-etching process, and its reaction product adheres to the surface of the glass substrate, and hence white turbidity tends to be generated in the glass substrate.

CaO is a component not lowering the strain point of the glass but lowering only the high temperature viscosity, thereby improving the meltability of the glass, and the content thereof is 0 to 15%, preferably 0 to 12%, and more preferably 3 to 10%. In the case of alkali-free glass, CaO is an essential component, and it is necessary that CaO be contained in an amount of 3% or more in the glass composition. When the content of CaO is large, there are tendencies that the density and the thermal expansion coefficient of the glass increase, in addition to decrease in BHF resistance.

SrO is a component improving the chemical resistance and the devitrification resistance of the glass, and the content thereof is 0 to 15%, preferably 0 to 12%, and more preferably 1 to 10%. When the content of SrO is large, there is a tendency that the density and the thermal expansion coefficient of the glass increase.

BaO is a component improving the chemical resistance and the devitrification resistance of the glass, and the content thereof is 0 to 15%, preferably 0 to 12%, and more preferably 0 to 10%. When the content of BaO is large, there is a tendency that the density and the thermal expansion coefficient of the glass increase.

When alkaline earth metal oxides (MgO, CaO, SrO, BaO) are contained by mixing, the meltability and the devitrification resistance of the glass can be improved. When the amount of these components is large, the density of the glass tends to increase, and reduction of weight of the glass substrate becomes difficult. The contents of alkaline earth metal oxides, in total content, are 0 to 25%, preferably 1 to 22%, more preferably 5 to 20%, and still more preferably 7 to 18%.

$Na_2O$ is a component controlling the thermal expansion coefficient of the glass and enhancing the meltability of the glass, and the content thereof is 0 to 15% and preferably 0 to 10%. When the content of $Na_2O$ is large, the strain point of the glass tends to lower. $K_2O$ is a component controlling the thermal expansion coefficient of the glass and enhancing the meltability of the glass, and the content thereof is 0 to 10%. When the content of $K_2O$ is large, the strain point of the glass tends to lower. When used in LCD or organic EL displays, it is preferred that alkali metal oxides ($Na_2O$, $K_2O$, $Li_2O$) be not substantially contained. In this way, there is no possibility that an alkali metal ion is diffused in the film-formed semiconductor substance during a thermal treatment to deteriorate a membrane property, in the TFT production process, thus, reliability of TFT is not impaired.

$Cr_2O_3$ is a component influencing the transmittance of glass, and the content thereof is 0.0001 to 0.002%, preferably 0.0002 to 0.0015%, and more preferably 0.0003 to 0.001%. When the content of $Cr_2O_3$ is larger than 0.002%, the check precision of the melt failure check tends to decrease. On the other hand, when the content of $Cr_2O_3$ is smaller than 0.0001%, it is necessary to use glass raw materials of high purity and to strictly control the production process of the glass substrate, thereby leading to undue increase in the production cost of the glass substrate.

The glass substrate of this embodiment can contain the following components in the glass composition in addition to the above-mentioned components, in a proportion of up to 15%.

ZnO is a component improving the BHF resistance of the glass and improving the meltability of the glass, and the content thereof is 0 to 10%, preferably 0 to 5%, and more preferably 0 to 3%. When the content of ZnO is large, the glass is easily devitrified, and the strain point tends to lower.

$ZrO_2$ is a component improving the chemical resistance of the glass, in particular, the acid resistance, and improving the Young's modulus, and the content thereof is 0 to 10%, preferably 0 to 2%, and more preferably 0 to 1%. When the content of $ZrO_2$ is large, the liquidus temperature of the glass increases, and devitrified clots of zircon tend to be formed.

$As_2O_3$, $Sb_2O_3$, $SnO_2$, Cl, and F are components each acting as a fining agent, and the content thereof is, in total content, 0 to 2%, preferably 0 to 1.5%, and more preferably 0.01 to 1%. As the fining agent, C and $SO_3$ can be also contained in a range not influencing the transmittance of the glass substrate. From the standpoint of protection of environments, it is preferred that $As_2O_3$ be not substantially contained as the fining agent. Here, "$As_2O_3$ be not substantially contained" denotes a case in which the content of $As_2O_3$ in the glass composition is 1,000 ppm (mass) or less. Further, from the standpoint of protection of environments, it is preferred that $Sb_2O_3$ be not substantially contained as the fining agent. Here, "$Sb_2O_3$ be not substantially contained" denotes a case in which the content of $Sb_2O_3$ in the glass composition is 1,000 ppm (mass) or less.

$As_2O_3$ is a component influencing the transmittance, and when it is contained in the glass composition, the transmittance of the glass substrate tends to lower. On the other hand, when $SnO_2$ is contained in the glass composition in an amount of 0.01 to 2%, or 0.05 to 1%, and particularly 0.1 to 0.5%, the transmittance of the glass can be enhanced by the reducing effect of $SnO_2$. As described above, regarding $As_2O_3$, $Sb_2O_3$, it is preferred that $As_2O_3$ be not substantially contained from the standpoint of protection of environments. When the above-mentioned point is taken into consideration, it is preferred that $SnO_2$ be contained as an essential component and $As_2O_3$ and $Sb_2O_3$ be not substantially contained, as the fining agent.

$Fe_2O_3$ is a component exerting an influence on the transmission of the glass, and the content thereof is 0.001 to 0.03%, preferably 0.001 to 0.025%, more preferably 0.005 to 0.02%, still more preferably 0.006 to 0.02%, and particularly preferably 0.007 to 0.02%. When the content of $Fe_2O_3$ is larger than 0.03%, the transmittance of the glass substrate tends to lower. On the other hand, when the content of $Fe_2O_3$ is smaller than 0.001%, it is necessary to use glass raw materials of high purity and to strictly control the production process of the glass substrate, leading to undue increase in the production cost of the glass substrate.

As described above, it is preferable to reduce as much as possible the content of components absorbing light in the visible region or enhancing absorption of light in the visible region, for example, transition metal oxides. For example, it is preferable to regulate the content of $CeO_2$ to 0.1% or less (preferably 0.05% or less and more preferably 0.01% or less). However, if the production cost of the glass substrate is taken into consideration, it is preferable to regulate the content of $CeO_2$ to 0.001% or more. Further, it is preferable to regulate the content of $TiO_2$ to 0.1% or less (preferably 0.05% or less and more preferably 0.01% or less). However, if the production cost of the glass substrate is taken into consideration, it is preferable to regulate the content of $TiO_2$ to 0.001% or more. Further, it is preferable to regulate the content of NiO to 0.05% or less (preferably 0.01% or less and more preferably 0.005% or less). However, if the production cost of the glass substrate is taken into consideration, it is preferable to regulate the content of NiO to 0.001% or more.

In addition to the above-mentioned components, components showing no remarkable absorption in the visible region can be added, and for example, $Y_2O_3$, $Nb_2O_5$, and $La_2O_3$ can be contained in an amount of up to 5%. Those components each have an action of enhancing the strain point, the Young's modulus, and the like of glass. However, when the content thereof is too large, the density tends to increase.

The glass substrate in this embodiment can be produced by placing a glass raw material which is prepared to have a desired glass composition in a continuous melting furnace, melting the glass raw material by heating at 1,450 to 1,650° C., fining the resultant, feeding the resultant to a forming apparatus, forming the molten glass into a plate shape, and gradually cooling the resultant. Further, as the methods of regulating the transmittance of the glass substrate in the wavelength range of 500 to 800 nm to 80% or more and regulating the difference between the transmittance at a wavelength of 550 nm and at a route length of 50 mm and the transmittance at a wavelength of 650 nm and at a route length of 50 mm to 3% or less, there are exemplified: (1) a method of using a glass raw material containing a small amount of impurities which lowers transmittance, in particular, a glass raw material containing a small amount of $Cr_2O_3$; (2) a method of preventing mixing of $Cr_2O_3$ and the like in the production process of the glass substrate; and (3) a method of adjusting the melting conditions of the glass, for example, melting temperature, melting atmosphere, and melting time.

As the material of a melting bath, alumina refractories such as alumina electrocast brick, zirconia refractories, zircon refractories, quartz refractories such as silica block, and the like are preferably used. Those refractories are suitable because they are not easily corroded by molten glass, and show small elution of components into glass.

Also in the glass substrate of this embodiment, it is preferred that the glass substrate is formed by the overflow downdraw method, for the same reason as described for the first embodiment.

As the method of forming the glass substrate in this embodiment, various methods can be adopted in addition to the overflow downdraw method. For example, there can be adopted a float method, a slot downdraw method, and a roll out method.

The glass substrate of this embodiment is also preferably used in displays. In the glass substrate of this embodiment, the transmittance at a wavelength of 550 nm and at a route length of 50 mm is high and a difference between the transmittance at a wavelength of 550 nm and at a route length of 50 mm and the transmittance at a wavelength of 650 nm and at a route length of 50 mm is small, thus, a melt failure can be detected easily, and requirements for higher definition and higher performance of recent displays can be satisfied. It is preferred that the glass substrate of this embodiment be used in LCD or organic EL displays. The glass substrate of this embodiment is capable of easily improving the productivity and decreasing cost of LCD or organic EL displays, because the substrate size is large, the transmittance at a wavelength of 550 nm and at a route length of 50 mm is high, and a difference between the transmittance at a wavelength of 550 nm and at a route length of 50 mm and the transmittance at a wavelength of 650 nm and at a route length of 50 mm is small. Further, the glass substrate of this embodiment is capable of satisfying various properties required for a LCD or an organic EL display, thus, suitable for the application thereto.

EXAMPLE 1

Tables 1 and 2 show Example 1 of the present invention (sample Nos. 1 to 15), and Table 3 shows Comparative Example 1 of the present invention (sample Nos. 16, 17).

TABLE 1

|  |  | Example 1 | | | | | | |
|---|---|---|---|---|---|---|---|---|
|  |  | 1 | 2 | 3 | 4 | 5 | 6 | 7 |
| Glass composition | $SiO_2$ | 60.5 | 60.5 | 59.5 | 61.5 | 60.5 | 61.5 | 58.5 |
| (mass %) | $Al_2O_3$ | 16 | 17 | 16 | 17 | 16 | 15 | 15 |
|  | $B_2O_3$ | 10 | 9 | 10 | 10 | 10 | 10 | 9 |
|  | MgO | 1 | 1 | 2 | 1 | 1 | — | 1 |
|  | CaO | 5 | 5 | 4 | 4 | 5 | 6 | 7 |
|  | SrO | 5 | 5 | 5 | 5 | 5 | 3 | 6 |
|  | BaO | 2 | 2 | 3 | 1 | 2 | 4 | 2 |
|  | ZnO | — | — | — | — | — | — | 1 |
|  | $Sb_2O_3$ | 0.5 | 0.5 | 0.5 | 0.5 | 0.5 | 0.5 | 0.5 |
|  | C | — | — | — | — | — | — | 0.005 |
|  | $Fe_2O_3$ | 0.010 | 0.015 | 0.020 | 0.028 | 0.010 | 0.015 | 0.020 |
| Transmittance (%) | 500 nm | 86.0 | 85.4 | 85.0 | 84.4 | 85.5 | 84.5 | 86.0 |
| Route length 50 mm | 800 nm | 83.5 | 83.0 | 82.5 | 82.1 | 84.0 | 83.5 | 81.5 |
| Melt failure check (route length 2,000 mm) |  | ○ | ○ | ○ | ○ | ○ | ○ | ○ |

TABLE 2

| | | Example 2 | | | | | | | |
|---|---|---|---|---|---|---|---|---|---|
| | | 8 | 9 | 10 | 11 | 12 | 13 | 14 | 15 |
| Glass composition (mass %) | $SiO_2$ | 54.7 | 59.7 | 58.7 | 60.6 | 63.4 | 59.7 | 60.7 | 55 |
| | $Al_2O_3$ | 13 | 16 | 16 | 17 | 16 | 16 | 15 | 7 |
| | $B_2O_3$ | 7 | 10 | 8 | 7 | 10 | 10 | 10 | — |
| | MgO | 1 | — | 1 | 3 | 1 | — | — | 3 |
| | CaO | 5 | 5 | 4 | 4 | 8 | 8 | 5 | 4 |
| | SrO | 4 | 5 | 2 | 7 | 1 | 5 | 5 | 6 |
| | BaO | 15 | 3 | 10 | 1 | — | 1 | — | 10 |
| | ZnO | — | 1 | — | — | — | — | — | — |
| | $Na_2O$ | — | — | — | — | — | — | 2 | 5 |
| | $K_2O$ | — | — | — | — | — | — | 2 | 5 |
| | $ZrO_2$ | — | — | — | 0.1 | 0.3 | 0.1 | — | 5 |
| | $SnO_2$ | 0.3 | 0.3 | 0.3 | 0.3 | 0.3 | 0.2 | 0.3 | — |
| | $Fe_2O_3$ | 0.015 | 0.015 | 0.020 | 0.020 | 0.015 | 0.015 | 0.015 | 0.010 |
| Density (g/cm³) | | 2.7 | 2.5 | 2.6 | 2.5 | 2.4 | 2.5 | 2.5 | 2.8 |
| Thermal expansion coefficient (×10⁻⁷/° C.) | | 45 | 37 | 38 | 38 | 32 | 38 | 50 | 85 |
| Strain point (° C.) | | 640 | 660 | 660 | 670 | 660 | 660 | 630 | 600 |
| Softening point (° C.) | | 900 | 950 | 970 | 950 | 980 | 930 | 900 | 850 |
| $10^{2.5}$ dPa·s (° C.) | | 1,500 | 1,560 | 1,590 | 1,530 | 1,600 | 1,550 | 1,500 | 1,450 |
| Acid resistance | | ○ | ○ | ○ | ○ | ○ | ○ | ○ | ○ |
| BHF resistance | | ○ | ○ | ○ | ○ | ○ | ○ | ○ | Δ |
| Young's modulus (GPa) | | 75 | 70 | 70 | 80 | 70 | 75 | 65 | 80 |
| Transmittance (%) Route length 50 mm | 500 nm | 85.5 | 85.4 | 85.1 | 85.1 | 84.5 | 85.5 | 85.0 | 86.0 |
| | 800 nm | 83.0 | 83.0 | 82.7 | 82.7 | 83.5 | 84.0 | 82.8 | 85.0 |
| Melt failure check (route length 2,000 mm) | | ○ | ○ | ○ | ○ | ○ | ○ | ○ | ○ |

TABLE 3

| | | Comparative Example 1 | |
|---|---|---|---|
| | | 16 | 17 |
| Glass composition (mass %) | $SiO_2$ | 61 | 61 |
| | $Al_2O_3$ | 16 | 16 |
| | $B_2O_3$ | 10 | 10 |
| | MgO | 1 | 1 |
| | CaO | 5 | 5 |
| | SrO | 5 | 5 |
| | BaO | 2 | 2 |
| | C | 0.010 | — |
| | $Fe_2O_3$ | 0.020 | 0.035 |
| Transmittance (%) Route length 50 mm | 500 nm | 85.2 | 83.8 |
| | 800 nm | 77.3 | 78.8 |
| Melt failure check (route length 2,000 mm) | | x | x |

Samples in the tables were produced as described below.

A batch containing glass raw materials so prepared as to give the glass composition shown in the tables was placed in a platinum crucible, and the glass raw materials were melted at 1,600° C. for 23.5 hours, cast on a carbon plate, and molded into a plate shape. Then, the molded glass was placed in an anneal furnace maintained at 750° C. and cooled gradually to obtain each sample.

The density was measured by a known Archimedes method.

The thermal expansion coefficient was measured in the temperature range of 30 to 380° C. using a dilatometer.

The strain point was measured by a method based on ASTM C336.

The softening point was measured by a method based on ASTM C338.

The temperature at high temperature viscosity of $10^{2.5}$ dPa·s was measured by a known platinum sphere lifting method.

The Young's modulus was measured by a resonance method.

Each sample was treated under conditions of 20° C. and 15 minutes using a 63BHF solution, and the surface of the sample was visually observed to evaluate BHF resistance. Specifically, a sample having no white turbidity, roughness, and crack on the surface was evaluated as "○", a sample having white turbidity on the surface but having no roughness and crack on the surface was evaluated as "Δ", and a sample having white turbidity on the surface and having roughness or crack on the surface was evaluated as "x".

Each sample was treated under conditions of 80° C. and 3 hours using a 10% aqueous solution of hydrochloric acid, and the surface of the sample was visually observed to evaluate acid resistance. Specifically, a sample having no white turbidity, roughness, and crack on the surface was evaluated as "○", a sample having white turbidity on the surface but having no roughness and crack on the surface was evaluated as "Δ," and a sample having white turbidity on the surface and having roughness or crack on the surface was evaluated as "x".

The transmittance at wavelengths of 500 nm and 800 nm and at a route length of 50 mm was measured as described below. First, each sample was cut into pieces with a thickness of 50 mm, and the cut surface was then mirror-polished, to obtain measurement samples with a thickness of 50 mm. Next, the transmittance of the measurement samples at wavelengths of 500 nm and 800 nm was measured using a spectrophotometer.

The melt failure check at a route length of 2,000 mm was carried out as described below. First, each sample was subjected to blue burner processing to manufacture a clear rod having a length of 2,000 mm, and its both end surfaces were mirror-polished. Next, light was allowed to enter from one end surface, and the illuminance at the other end surface side (non-incident side) was measured. Judging from the measured values of the illuminance, a sample in which melt failure of 25 μm were able to be detected was evaluated as "○", and a sample in which melt failure of 25 μm were not able to be detected was evaluated as "x".

As apparent from Tables 1 and 2, in the samples Nos. 1 to 15, each of the transmittances at wavelengths of 500 nm and 800 nm and at a route length of 50 mm was 80% or more, that is, the transmittance at a wavelength of 500 to 800 nm and at a route length of 50 mm was 80% or more, and the evaluation of the melt failure check at a route length of 2,000 mm was excellent.

On the other hand, as apparent from Table 3, in the sample No. 16 had a content of $Fe_2O_3$ of 0.020%, and was melted after C as a reducing agent was added, with the result that the transmittance at 800 nm was less than 80%, and the evaluation of the melt failure check at a route length of 2,000 mm was poor. The sample No. 17 had a content of $Fe_2O_3$ of 0.035%, with the result that the transmittance at 800 nm was less than 80%, and the evaluation of the melt failure check at a route length of 2,000 mm was poor.

Further, the samples Nos. 1 to 15 were melted in a test melting furnace and formed by the overflow downdraw method, whereby produced were glass substrates having a not-polished surface, showing a waviness of 0.1 μm or less, and having a measurement of 2,000 mm×2,000 mm×0.5 mm thick. The transmittance of the glass substrate at a wavelength of 500 to 800 nm and at a route length of 50 mm was 80% or more, and a melt failure of 25 μm was able to be detected by the melt failure check at a route length of 2,000 mm in the substrate. Here, the transmittance at a wavelength of 500 to 800 nm and at a route length of 50 mm was measured after the glass substrate was laminated on a 50 mm glass cell. In the measurement, infiltration liquid (benzyl alcohol) was infiltrated between the glass substrates in view of the influence of the surface reflectance. In the measurement, the average surface roughness Ra on the substrate end surface was regulated to 1 μm or less.

EXAMPLE 2

Tables 4 and 5 show Example 2 of the present invention (sample Nos. 1 to 15), and Table 6 shows Comparative Example 2 of the present invention (sample Nos. 16, 17).

TABLE 4

| | | Example 2 | | | | | | |
|---|---|---|---|---|---|---|---|---|
| | | 1 | 2 | 3 | 4 | 5 | 6 | 7 |
| Glass composition (mass %) | $SiO_2$ | 60.5 | 60.5 | 59.5 | 61.5 | 60.5 | 61.5 | 58.5 |
| | $Al_2O_3$ | 16 | 17 | 16 | 17 | 16 | 15 | 15 |
| | $B_2O_3$ | 10 | 9 | 10 | 10 | 10 | 10 | 9 |
| | MgO | 1 | 1 | 2 | 1 | 1 | — | 1 |
| | CaO | 5 | 5 | 4 | 4 | 5 | 6 | 7 |
| | SrO | 5 | 5 | 5 | 5 | 5 | 3 | 6 |
| | BaO | 2 | 2 | 3 | 1 | 2 | 4 | 2 |
| | ZnO | — | — | — | — | — | — | 1 |
| | $Sb_2O_3$ | 0.5 | 0.5 | 0.5 | 0.5 | 0.5 | 0.5 | 0.5 |
| | $Cr_2O_3$ | 0.0018 | 0.0015 | 0.0005 | 0.0003 | 0.0010 | 0.0005 | 0.0005 |
| Transmittance (%) Route length 50 mm | 550 nm | 85.2 | 85.6 | 86.1 | 86.3 | 85.8 | 86.0 | 86.1 |
| | 650 nm | 82.8 | 84.4 | 85.6 | 85.9 | 85.0 | 85.4 | 85.5 |
| | 550 nm – 650 nm | 2.4 | 1.2 | 0.5 | 0.4 | 0.8 | 0.6 | 0.6 |
| Melt failure check (route length 2,000 mm) | | ○ | ○ | ○ | ○ | ○ | ○ | ○ |

TABLE 5

| | | Example 2 | | | | | | | |
|---|---|---|---|---|---|---|---|---|---|
| | | 8 | 9 | 10 | 11 | 12 | 13 | 14 | 15 |
| Glass composition (mass %) | $SiO_2$ | 54.7 | 59.7 | 58.7 | 60.6 | 63.4 | 59.7 | 60.7 | 55 |
| | $Al_2O_3$ | 13 | 16 | 16 | 17 | 16 | 16 | 15 | 7 |
| | $B_2O_3$ | 7 | 10 | 8 | 7 | 10 | 10 | 10 | — |
| | MgO | 1 | — | 1 | 3 | 1 | — | — | 3 |
| | CaO | 5 | 5 | 4 | 4 | 8 | 8 | 5 | 4 |
| | SrO | 4 | 5 | 2 | 7 | 1 | 5 | 5 | 6 |
| | BaO | 15 | 3 | 10 | 1 | — | 1 | — | 10 |
| | ZnO | — | 1 | — | — | — | — | — | — |
| | $Na_2O$ | — | — | — | — | — | — | 2 | 5 |
| | $K_2O$ | — | — | — | — | — | — | 2 | 5 |
| | $ZrO_2$ | — | — | — | 0.1 | 0.3 | 0.1 | — | 5 |
| | SnO | 0.3 | 0.3 | 0.3 | 0.3 | 0.3 | 0.2 | 0.3 | — |
| | $Cr_2O_3$ | 0.0018 | 0.0006 | 0.0013 | 0.0011 | 0.0005 | 0.0003 | 0.0003 | 0.0007 |
| Density (g/cm$^3$) | | 2.7 | 2.5 | 2.6 | 2.5 | 2.4 | 2.5 | 2.5 | 2.8 |
| Thermal expansion coefficient ($\times 10^{-7}$/° C.) | | 45 | 37 | 38 | 38 | 32 | 38 | 50 | 85 |
| Strain point (° C.) | | 640 | 660 | 660 | 670 | 660 | 660 | 630 | 600 |
| Softening point (° C.) | | 900 | 950 | 970 | 950 | 980 | 930 | 900 | 850 |
| $10^{2.5}$ dPa·s (° C.) | | 1,500 | 1,560 | 1,590 | 1,530 | 1,600 | 1,550 | 1,500 | 1,450 |
| Acid resistance | | ○ | ○ | ○ | ○ | ○ | ○ | ○ | ○ |
| BHF resistance | | ○ | ○ | ○ | ○ | ○ | ○ | ○ | Δ |
| Young's modulus (GPa) | | 75 | 70 | 70 | 80 | 70 | 75 | 65 | 80 |

TABLE 5-continued

| | | Example 2 | | | | | | | |
|---|---|---|---|---|---|---|---|---|---|
| | | 8 | 9 | 10 | 11 | 12 | 13 | 14 | 15 |
| Transmittance (%) | 550 nm | 85.4 | 86.2 | 85.7 | 85.9 | 86.1 | 86.4 | 86.5 | 86.0 |
| Route length 50 mm | 650 nm | 83.1 | 85.6 | 84.5 | 84.7 | 85.6 | 86.0 | 86.1 | 85.4 |
| | 550 nm – 650 nm | 2.3 | 0.6 | 1.2 | 1.2 | 0.5 | 0.4 | 0.4 | 0.6 |
| Melt failure check (route length 2,000 mm) | | ○ | ○ | ○ | ○ | ○ | ○ | ○ | ○ |

TABLE 6

| | | Comparative Example 2 | |
|---|---|---|---|
| | | 16 | 17 |
| Glass composition (mass %) | $SiO_2$ | 60.5 | 61 |
| | $Al_2O_3$ | 16 | 16 |
| | $B_2O_3$ | 10 | 10 |
| | MgO | 1 | 1 |
| | CaO | 5 | 5 |
| | SrO | 5 | 5 |
| | BaO | 2 | 2 |
| | $Sb_2O_3$ | 0.5 | — |
| | $Cr_2O_3$ | 0.0025 | 0.0040 |
| Transmittance (%) | 550 nm | 85.0 | 84.6 |
| Route length 50 mm | 650 nm | 81.7 | 80.6 |
| | 550 nm – 650 nm | 3.3 | 4.0 |
| Melt failure check (route length 2,000 mm) | | x | x |

Each sample in the tables was manufactured by the same method as that described in the section of Example 1. The physical values of each sample were measured by the same measurement method as that described in the sections of Example 1. The BHF resistance and acid resistance were evaluated according to the same conditions and evaluation criteria as those described in the sections of Example 1.

The transmittance at wavelengths of 550 nm and 650 nm and at a route length of 50 mm was measured as described below. First, each sample was cut into pieces with a thickness of 50 mm, and the cut surface was mirror-polished to obtain measurement samples with a thickness of 50 mm. Next, each of the transmittances of the measurement samples at wavelengths of 550 nm and 650 nm was measured using a spectrophotometer.

The melt failure check at a route length of 2,000 mm was carried out as described below. First, each sample was subjected to blue burner processing to manufacture a clear rod having a length of 2,000 mm, and its both end surfaces were mirror-polished. Next, light was allowed to enter from one end surface, and the illuminance at the other end surface (non-incident side) was measured. Judging from the measured values of the illuminance, a sample in which melt failure of 25 μm were able to be detected was evaluated as "○", and a sample in which melt failure of 25 μm were not able to be detected was evaluated as "x".

As apparent from Tables 4 and 5, in the samples Nos. 1 to 15, the transmittance at a wavelength of 550 nm and at a route length of 50 mm was 85% or more, and a difference between the transmittance at a wavelength of 550 nm and at a route length of 50 mm and the transmittance at a wavelength of 650 nm and at a route length of 50 mm was 3% or less, and hence the evaluation of the melt failure check at a route length of 2,000 mm was good.

On the other hand, as apparent from Table 6, in the sample No. 16, because the content of $Cr_2O_3$ was 0.0025%, a difference between the transmittance at a wavelength of 550 nm and at a route length of 50 mm and the transmittance at a wavelength of 650 nm and at a route length of 50 mm was more than 3%, and the evaluation of the melt failure check at a route length of 2,000 mm was poor. In the sample No. 17, because the content of $Cr_2O_3$ was 0.0040%, the transmittance at a wavelength of 550 nm and at a route length of 50 mm was less than 85% and, in addition, a difference between the transmittance at a wavelength of 550 nm and at a route length of 50 mm and the transmittance at a wavelength of 650 nm and at a route length of 50 mm was more than 3%, and the evaluation of the melt failure check at a route length of 2,000 mm was poor.

Further, the samples Nos. 1 to 15 were melted in a test melting furnace and formed by the overflow downdraw method, to thereby produce glass substrates in which the substrate surfaces were not polished, the waviness thereof was 0.1 μm or less, and the substrate size was 2,000 mm×2,000 mm×0.5 mm thick. In those substrates, the transmittance at a wavelength of 550 nm and at a route length of 50 mm was 85% or more, a difference between the transmittance at a wavelength of 550 nm and at a route length of 50 mm and the transmittance at a wavelength of 650 nm and at a route length of 50 mm was 3% or less, and a melt failure of 25 μm could be detected by the melt failure check at a route length of 2,000 mm. Here, the transmittance at a wavelength of 550 nm and at a route length of 50 mm and the transmittance at a wavelength of 650 nm and at a route length of 50 mm were measured on the glass substrate laminated on a 50-mm glass cell. In the measurement, infiltration liquid (benzyl alcohol) was infiltrated between the glass substrates in view of the influence of the surface reflectance. In the measurement, the average surface roughness Ra at the substrate end surface was regulated to 1 μm or less.

INDUSTRIAL APPLICABILITY

As apparent from the descriptions above, the glass substrate of the present invention is suitable as a substrate for flat panel displays such as LCD, organic EL displays, inorganic EL displays, PDP, and FED. Further, the glass substrate of the present invention is also suitable for a cover glass for image sensors such as charge coupled devices (CCD) and contact image sensors (CIS), and for a solar battery substrate.

The invention claimed is:
1. A glass substrate, which has a substrate size of 1,100 mm×1,250 mm or more, a transmittance at a wavelength of 550 nm and at a route length of 50 mm of 85% or more, a difference between the transmittance at a wavelength of 550 nm and at a route length of 50 mm and a transmittance at a wavelength of 650 nm and at a route length of 50 mm of 3% or less, and an average surface roughness Ra of a substrate end surface of 1 μm or less, and wherein the glass substrate comprises 0.0001 to 0.002 mass % of $Cr_2O_3$ in a glass composition.

2. A glass substrate according to claim 1, wherein the glass substrate is free of a melt failure of 25 μm or more.

3. A glass substrate according to claim 1, wherein a surface of the glass substrate is free from being polished and has a waviness of 0.1 μm or less.

4. A glass substrate according to claim 1, wherein the glass substrate is formed by an overflow downdraw method.

5. A glass substrate according to claim 1, which has a glass composition comprising, by mass % in terms of oxide, 50 to 80% of $SiO_2$, 0 to 20% of $B_2O_3$, 0 to 15% of MgO, 0 to 15% of CaO, 0 to 15% of SrO, 0 to 15% of BaO, 0 to 15% of $Na_2O$, 0 to 10% of $K_2O$, and 0.0001 to 0.002% of $Fe_2O_3$.

6. A glass substrate according to claim 1, which has a glass composition comprising 3 to 20 mass % of $B_2O_3$ and is substantially free of an alkali metal oxide.

7. A display comprising the glass substrate according to claim 1.

8. A liquid crystal display or an organic EL display comprising the glass substrate according to claim 1.

* * * * *